Patented Feb. 15, 1927.

1,617,946

UNITED STATES PATENT OFFICE.

GERHARDT E. GRIMM, OF SPRINGFIELD, MASSACHUSETTS, ASSIGNOR TO WESTFIELD RIVER PAPER COMPANY, OF RUSSELL, MASSACHUSETTS, A CORPORATION OF MASSACHUSETTS.

TINTED BURNISHED METAL-COATED PAPER.

No Drawing.   Application filed January 14, 1925. Serial No. 2,443.

This invention is an improvement in embossed paper, and more particularly in metal coated embossed paper.

In my co-pending application Ser. No. 2441 of even date herewith, a process of treating paper is set forth, wherein the paper is provided with a metallic coating, having a very high luster, and a considerable degree of iridescence. Substantially every character of metallic powder may be used, with a basic solution, thereby to impart to the paper the desired tint, merely by adding the powder to the solution in the correct proportions.

The composition bearing the trade name "argentine" composed of a finely divided tin moss or sponge obtained from a tin solution by precipitation with zinc, is not adapted for use with the basic solution, since it must be applied with an adhesive, (usually starch paste) a constituent which the basic solution does not contain.

The finish of paper coated with this composition is obtained by burnishing, and where burnishing is relied upon to impart the desired finish, metallic powders should be applied with an adhesive, since when they are applied in alcohol as a vehicle, the best effects from burnishing do not obtain. Such powders, namely argentine, aluminum, silver and gold, give very beautiful effects, each in a single color phase, and they provide a very desirable ground work for tinting with various colors, when the tint is so applied that the sheen and luster of the metal coating are visible through the applied tint.

The said paper is also well adapted for embossing, and I have discovered that very beautiful effects may be obtained by tinting the embossed burnished paper with various colors, applied in the basic solution forming the subject matter of my co-pending application Ser. No. 2440 of even date herewith, and subjecting the paper while still wet to a particular treatment.

The solution above mentioned is composed of a hard resin, (lac or shellac) a soft gum (elemi) and a dry wax (stearic acid) in alcoholic solution, and is applied in the present instance by means of brushes, a selected tint being added to the solution before applying. By the term dry wax is meant a wax substantially free from water.

The tinted solution is applied to the argentine treated face or faces, and while the treated surface is still moist the solution is worked by means of reciprocating brushes. This treatment apparently lessens the depth of the tint on the high portions of the embossed surface, and in the finished article gives various effects of changing light, shadow and color, in accordance with the direction of light, the shades blending smoothly one into the other.

The tinted solution should be applied lightly, and the solution should be relatively thin, and always be applied after embossing, as the embossing hides or minimizes any slight imperfections there may be in the tinted coating. Such imperfections would be emphasized if the embossing were done after the tinting.

Substantially any dye may be used to impart the desired tint to the paper, either aniline or vegetable. Dragon's blood, saffron and the like may be used, and the method may be applied to the tinting of plain paper, with equal advantage. The term light is used to define the depth of the tint applied, and not the color, which may be of any shade desired.

The basic solution referred to is an alcoholic solution of a hard resin, a soft gum or oil, with a dry wax. A suitable hard resin is lac, commonly known as shellac, and either gum elemi or castor oil may be used with the lac. The gum elemi or castor oil when used acts as a softening agent for the lac. A preferred dry wax is stearic acid. The solution is prepared by dissolving the ingredients separately each in a selected quantity of alcohol. The three essential ingredients each in its solution, are then mixed together in a selected ratio.

A preferred selection of alcohol quantities for the initial solution for the several ingredients is as follows:

\#1, lac 60 lbs., alcohol 20 gal.
\#2, gum elemi 25 lbs., alcohol 15 gal.
\#3, stearic acid 6 lbs., alcohol 12 gal.

Heat may be used with the first and second solutions to facilitate the action if desired. When castor oil is used instead of gum elemi, it is mixed with alcohol, in the proportion of about 1 lb. of the oil to 2 gal. of the alcohol.

The several solutions, which have been designated Nos. 1, 2 and 3 are combined as follows to make the basic solution.

1, 6 gal.
2, 3 gal.
3, 1½ gal., alcohol 2 gal.

When the gum elemi is replaced by castor oil, the several solutions are combined in the following proportions:

1, 6 gal.
2, ½ gal.
3, 2 gal.

With either of these basic solutions, the selected color is mixed in the usual manner, sufficient color being added to produce the tint desired.

I claim:

1. Burnished metal coated paper having superposed thereon a thin relatively light color in a transparent medium, including a hard resin, a soft gum, and a dry wax.

2. Embossed burnished metal coated paper having superposed thereon a thin relatively light color in a transparent medium, including a hard resin, a soft gum, and a dry wax.

3. Embossed burnished metal coated paper having superposed thereon a thin relatively light color in a transparent medium, including lac, a softening agent, and a dry wax.

4. Embossed burnished metal coated paper having superposed thereon a thin relatively light color in a transparent medium, including lac, gum elemi, and a dry wax.

5. Embossed burnished metal coated paper having superposed thereon a thin relatively light color in a transparent medium, including lac, gum elemi, and stearic acid.

6. The method of making tinted art paper, which consists in applying to the paper a metal coating, burnishing and superposing on the burnished coating a thin relatively light color in a transparent solution including a hard resin, a soft gum, and a dry wax, in alcoholic solution.

7. The method of making tinted art paper, which consists in applying to the paper a coat of metal, burnishing, embossing the coated paper, and tinting with a thin relatively light color in a transparent medium through which the sheen of the metal coating is visible.

8. The method of making tinted art paper, which consists in applying to the paper a coat of metal, burnishing, embossing, and tinting with a thin relatively light color in a transparent solution including a hard resin, a soft gum, and a dry wax in alcoholic solution.

9. The method of making tinted art paper, which consists in applying to the paper a coat of metal, burnishing, embossing the coated paper, and tinting with a thin relatively light color in a transparent medium through which the sheen of the metal coating is visible, and subjecting the tinted surface to a light rubbing action while moist.

10. The method of making tinted art paper, which consists in applying to the paper a coat of metal, burnishing, embossing, tinting with a thin relatively light color in a transparent solution, and rubbing while moist.

Signed at New York in the county of New York and State of New York this 10th day of January, A. D. 1925.

GERHARDT E. GRIMM.